US011157079B2

(12) United States Patent
Osman (10) Patent No.: US 11,157,079 B2
(45) Date of Patent: Oct. 26, 2021

(54) MULTI-PLAYER CALIBRATION OF VARIOUS STAND-ALONE CAPTURE SYSTEMS

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 18 days.

(21) Appl. No.: 16/670,209

(22) Filed: Oct. 31, 2019

(65) Prior Publication Data

US 2021/0132694 A1    May 6, 2021

(51) Int. Cl.
*G06F 3/01*     (2006.01)
*G06F 3/0346*   (2013.01)
*G09G 5/12*     (2006.01)

(52) U.S. Cl.
CPC ............ *G06F 3/014* (2013.01); *G06F 3/0346* (2013.01); *G09G 5/12* (2013.01); *G09G 2354/00* (2013.01)

(58) Field of Classification Search
CPC .... G09G 2354/00; G06F 3/0346; G06F 3/014
See application file for complete search history.

(56) References Cited

U.S. PATENT DOCUMENTS

| 10,838,488 | B2* | 11/2020 | Gibson | G06T 17/00 |
| 10,838,502 | B2* | 11/2020 | Hastings | G06F 3/048 |
| 10,996,814 | B2* | 5/2021 | Gelman | G06K 9/00671 |
| 2011/0224507 | A1* | 9/2011 | Banet | H04W 4/029 600/301 |
| 2016/0091965 | A1* | 3/2016 | Wang | G06F 3/0346 345/156 |
| 2016/0363997 | A1* | 12/2016 | Black | G06F 3/016 |
| 2017/0038829 | A1* | 2/2017 | Lanier | G06F 3/04883 |
| 2018/0005429 | A1* | 1/2018 | Osman | G06T 15/20 |
| 2019/0287083 | A1* | 9/2019 | Wurmfeld | G06Q 20/102 |
| 2019/0379765 | A1* | 12/2019 | Fajt | H04L 67/38 |

* cited by examiner

*Primary Examiner* — William Boddie
*Assistant Examiner* — Bipin Gyawali
(74) *Attorney, Agent, or Firm* — John L. Rogitz (57) ABSTRACT

Two virtual reality (VR) systems are calibrated to share a common reference frame using a calibration step in which multiple VR users clap each other's hands. As two players do so, spikes are detected in the motion data when their hands come in contact. The spikes are used to effect timing synchronization of the disparate systems to align the motions.

20 Claims, 5 Drawing Sheets

MULTI-PLAYER CALIBRATION OF VARIOUS STAND-ALONE CAPTURE SYSTEMS

FIELD

The present application relates to technically inventive, non-routine solutions that are necessarily rooted in computer technology and that produce concrete technical improvements.

BACKGROUND

As recognized herein, given multiple stand-alone or inside-out tracking systems, it can be challenging to align the different reference frames. For instance, for two individuals using inside-out virtual reality (VR) tracking systems for hand, head and body, while the relative motions of the bodies can be fairly accurate, reconciling the absolute reference frames of the two VR systems to allow things such as a hand-shake can be different.

There are currently no adequate solutions to the foregoing computer-related, technological problem.

SUMMARY

The challenge above is met using a calibration step in which multiple VR users clap each other's hands, e.g., by giving themselves high-fives or by playing patty-cake with each other to calibrate their absolute positions. As two players play patty cake, spikes are detected in the motion data when their hands come in contact. The spikes are used to effect timing synchronization of the disparate systems to align the motions. Errors are further reduced by prolonged calibration, with calibration being terminated once a reasonable error threshold is achieved after a few successive hand claps.

Accordingly, in one aspect a device includes at least one processor and at least one computer memory that is not a transitory signal and that in turn includes instructions executable by the at least one processor to receive respective first second contact signals from respective sensors associated with respective first and second systems. For example, the systems may be borne by first and second users. The instructions are executable to, using the first and second contact signals, establish at least one positional reference for at least a first virtual reality (VR) apparatus associated with the first system, e.g., worn by the first user.

In examples, the respective sensors are supported by respective gloves worn by the respective users. In other examples, the respective sensors are supported by respective rigid implements wielded by the respective users.

In some embodiments, the respective sensors may include motion sensors, pressure sensors, sound sensors, image sensors, and combinations thereof.

In some embodiments, the instructions may be executable to determine whether at least a first characteristic of the first contact signal matches at least one corresponding first characteristic of the second contact signal. The instructions can be executable to, responsive to identifying that the first characteristic of the first contact signal matches the first characteristic of the second contact signal, establish the positional reference, whereas responsive to identifying that the first characteristic of the first contact signal does not match the first characteristic of the second contact signal, not establish the positional reference. The first characteristic may include a spike waveform shape.

In non-limiting examples, the instructions are executable to determine whether a timestamp of the first contact signal matches a timestamp of the second contact signal. In these examples, the instructions are executable to, responsive to identifying that the timestamp of the first contact signal matches the timestamp of the second contact signal, establish the positional reference, whereas responsive to identifying that the timestamp of the first contact signal does not match the timestamp of the second contact signal, the positional reference is not established In some implementations, the instructions are executable to determine whether a location associated with the first contact signal matches a location associated with the second contact signal. The instructions may be executable to, responsive to identifying that the location associated with the first contact signal matches the location associated with the second contact signal, establish the positional reference, and responsive to identifying that the location associated with the first contact signal does not match the location associated with the second contact signal, not establish the positional reference. In these latter implementations, determining whether the location associated with the first contact signal matches the location associated with the second contact signal uses a first difference threshold. Responsive to identifying that the location associated with the first contact signal matches the location associated with the second contact signal according to the first difference threshold, the instructions can be executable to determine whether the location associated with the first contact signal matches the location associated with the second contact signal according to a second difference threshold smaller than the first distance threshold, and responsive to identifying that the location associated with the first contact signal matches the location associated with the second contact signal according to the second distance threshold, not generate a prompt for a further clap. On the other hand, the instructions may be executable to, responsive to identifying that the location associated with the first contact signal does not match the location associated with the second contact signal according to the second distance threshold, generate a prompt for a further clap.

In another aspect, a method includes receiving first and second contact signals from respective first and second user-borne devices and using the first and second contact signals to establish a position reference in at least one virtual reality (VR) apparatus. The position reference is used to present images on the VR apparatus.

In another aspect, an apparatus includes at least one computer readable storage medium that is not a transitory signal and that includes instructions executable by at least one processor to receive respective contact signals from respective sensors borne by respective users responsive to respective sensor devices supported by the respective users contacting each other. The instructions are executable to, using the contact signals, determine a position reference, and then use the position reference in each of respective virtual reality systems associated with the respective users to present, in each VR system, an image of the other user.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled headphones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Figure 1:
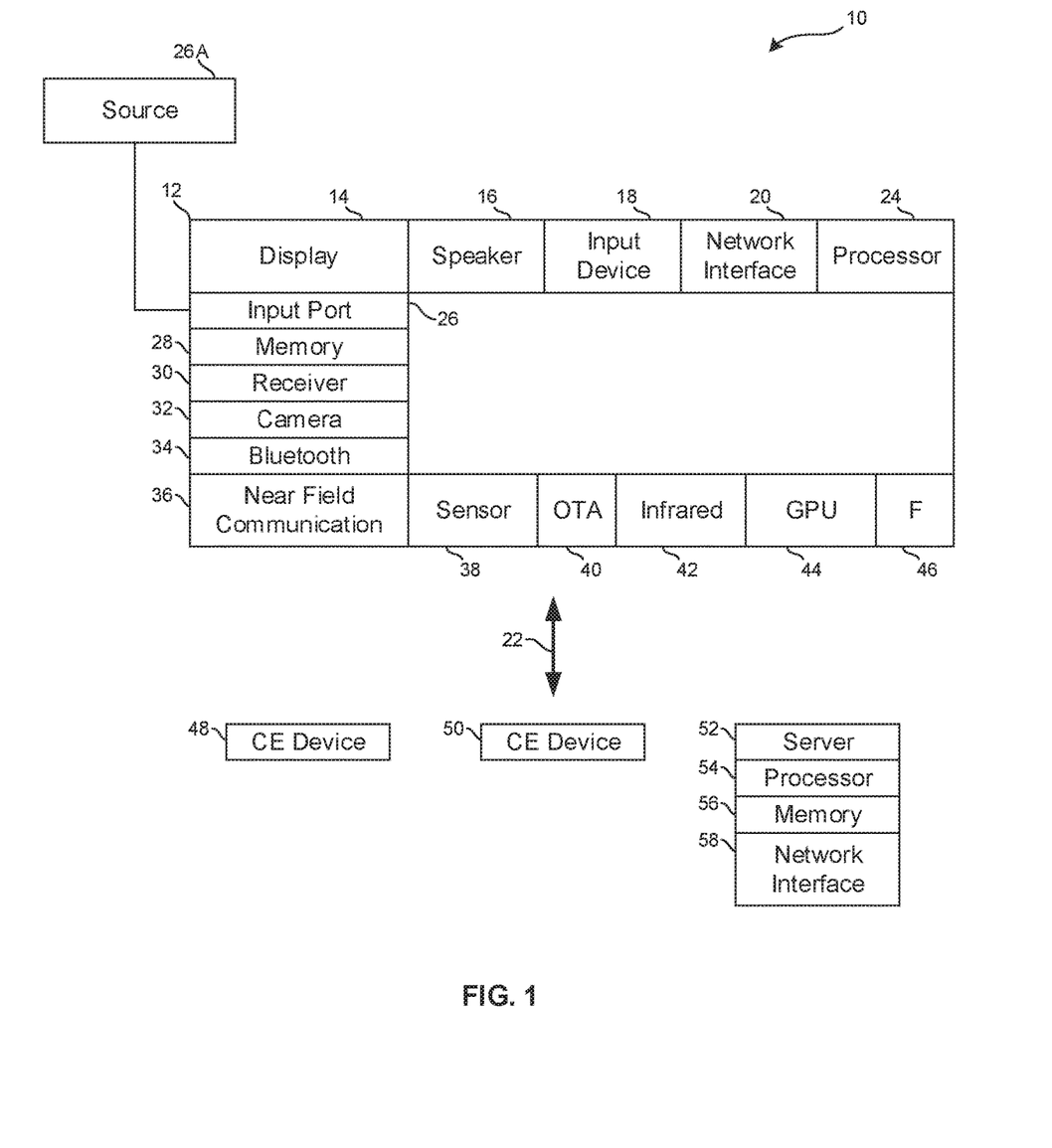
FIG. 1 is a block diagram of an example system consistent with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22, such as the Internet, a WAN, a LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
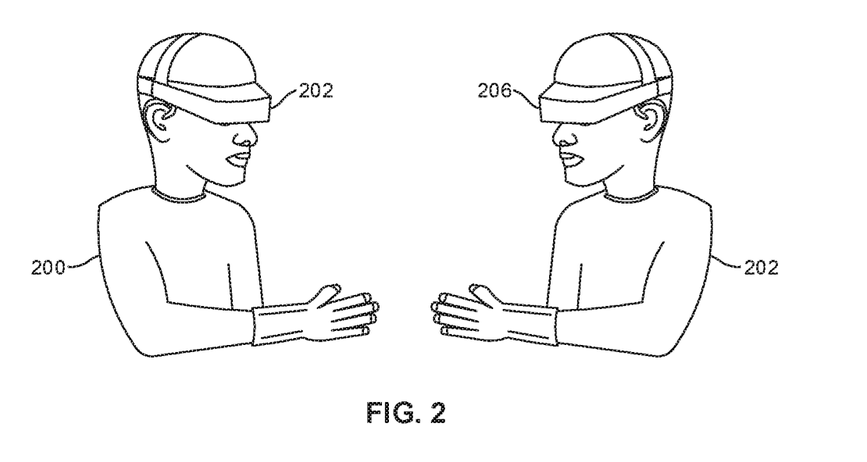
FIG. 2 illustrates two players wearing VR headsets attempting to shake hands, which requires the headsets to share a common reference frame so that the opposing player is rendered in a location corresponding to the opposing player's real-world position.

FIG. 2 illustrates first and second users 200, 202 each wearing a respective virtual reality (VR) headset 204, 206. The VR headsets 204, 206 may include some or all of the electronic components shown in FIG. 1, as appropriate. As shown in FIG. 2, the users 200, 202 are attempting to shake hands, an act that requires accurate presentation on each user's VR headset of the opposite user's location.

Figure 3:
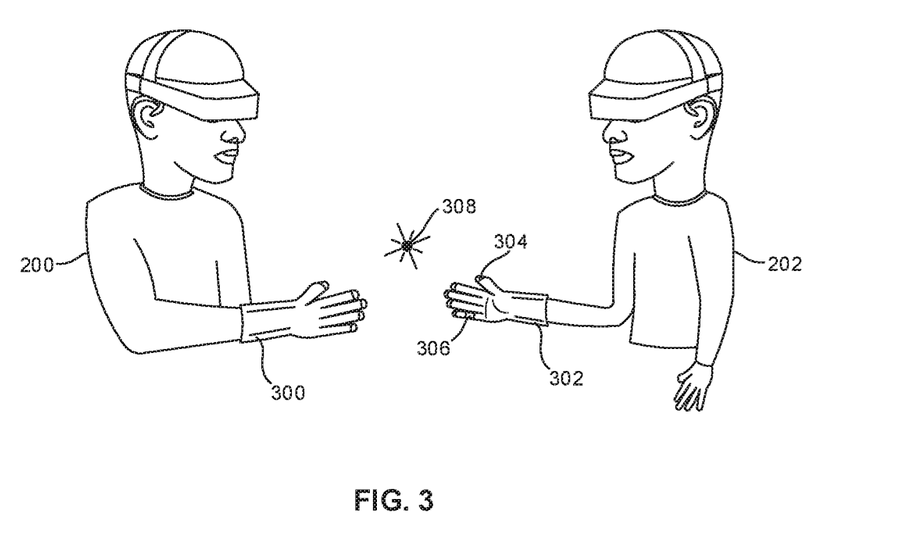
FIG. 3 illustrates the two players in the act of clapping hands.

FIG. 3 illustrates that the user 200, 202 may wear respective gloves 300, 302. Each glove 300, 302, among other components shown in FIG. 1, such as wireless transceivers, can include a respective motion sensor 304 and location sensor 306 such as a global positioning satellite (GPS) receiver or other location detecting device. Note that in addition to or in lieu of motion sensors, contact information may be provided by e.g., respective sound sensors, respective pressure sensors, or other appropriate sensors in the respective gloves.

The users 200, 202 can clap each other's hand at a location 308 in space. In other embodiments, instead of using gloves with motion sensors, cameras tied to the respective users' VR systems may be used for tracking the users' hands to note through image recognition when and where two hands clap. Indeed, detection of mutual contact and location thereof may be provided by using a closed-circuit video positioning system between the two users.

In still other embodiments, microphones tied to the respective users' VR systems may be used to detect by sound when the hands clap. Note that principles disclosed herein apply equally to one user clapping his hands together to establish a common reference/track the user's left and right hands when two tracking systems are used, one for each hand. In general, present principles may be used to establish a common position reference for disparate tracking systems that otherwise have no absolute reference point tying the two systems together.

Figure 4:
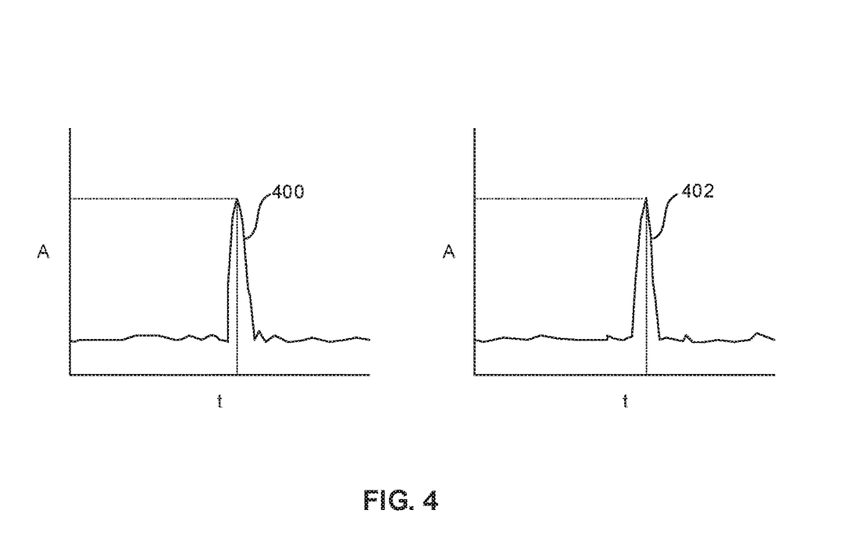
FIG. 4 schematically illustrates motion sensor signals from the players' hand sensors.

FIG. 4 illustrates in graph form that the clap of the users' hands results in an output signal 400 from the motion sensor of the first glove 300 and a similar output signal 402 from the motion sensor of the second glove 302. In the example shown, the x-axis represents time and the y-axis represents amplitude, such that each signal is associated with a maximum amplitude "A" at a time "t". In the example shown, the shape of each signal 400, 402 resembles a spike. Note that in some embodiments the signals do not have to be spikes per se, in that other sensors that do time synchronized sensing—even contact sensors—may be used to determine the users' hands are roughly at the same position.

Figure 5:
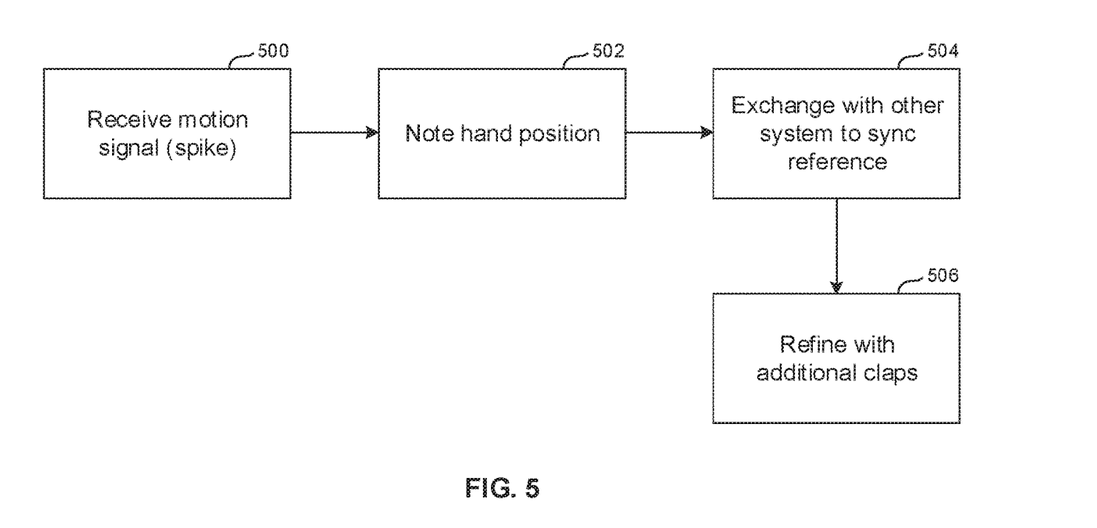
FIG. 5 is a flow chart of example logic consistent with present principles.
Figure 6:
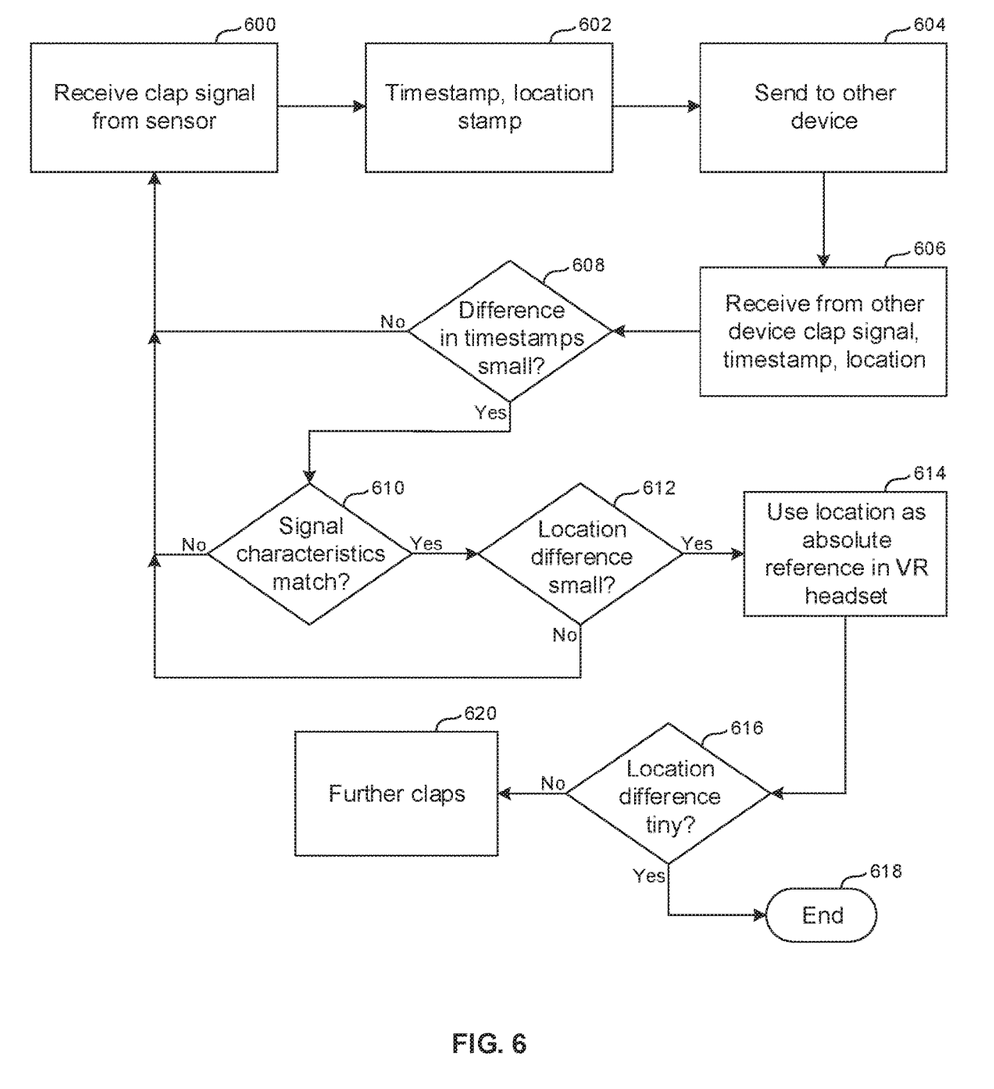
FIG. 6 is a flow chart of example detailed logic consistent with present principles.

FIG. 5 illustrates generalized logic and FIG. 6 illustrates a more detailed technique. Commencing at block 500, each headset 204, 206 shown in FIG. 2 receives from the user's respective glove 300, 302 a motion signal such as the signals shown in FIG. 4 in response to the users clapping the gloves 300, 302 together. The signals each are accompanied by respective generation times "t", essentially timestamps of when the signals were generated. Using the location sensors described herein, the locations of the gloves (and hence the hands of the users) at the time of signal generation is recorded.

Proceeding to block 504, the VR headsets 204, 206 transmit, e.g., via wireless links, each other's signal, timestamp, and associated glove location. The glove locations are used by each headset as a position reference. An average location, e.g., a location between the two identified locations, may be used by each headset. Subsequent images of the other user are presented on the VR headsets keyed to the position reference. The position reference may be refined at block 506 using additional hand claps as explained further below.

Once the position reference is established, it may be used by both VR systems in common as a shared reference point, for instance, to compute offsets for objects to be presented in the two VR systems. For example, if one user's hand is located in Cartesian coordinates at (5,0,0) in that user's VR system and the other user's hand is located at (17,0,0) in that user's VR system, then an offset of 12 (plus or minus as appropriate) is applied by each VR system in presenting the image of the other user's hand. It may be appreciated that the location reference preferably is located in all three spatial dimensions/axes, e.g., by high-fiving from different angles or the below-described multiple fist bumps.

In lieu of timestamps, each user's glove can track its location individually and record all of their tracking positions. One glove can transmit its location data to the other VR system. When the second VR system receives the data from the first VR system, it knows that the first glove thought it was at a certain position—but it cannot be sure when that was true. For instance, assuming this data is shared across a wireless link, there could be a variable amount of time/latency for one to transmit to the second. Assuming the devices have a clock that they both use such as through being internet connected, greater resolution/accuracy in timing is needed.

Accordingly, by looking at the spikes in motion, each system will know that that is the exact moment that they may wish to align. For example, the first device may detect a spike and transmit this fact to the second device, which when it receives the spike after a period of latency compares the position data from that packet to its own position data back when the event happened.

Now if in addition the devices share timestamps, then the two devices will know how far out of sync their internal clocks are. This information may be used to request predictions from each other at a specific moment in time. For example, the systems may query each other as to "where is the object at time xxx" where xxx can be some time in the past—interpolating past tracking data—or sometime in the future, extrapolating a predicted position.

FIG. 6 illustrates the technique in greater detail. In FIG. 6 multiple tests are respectively shown at steps 606, 610, and 612 for deciding whether to use a signal and associated glove location as the position reference, it being understood that only one or any combination of the tests in FIG. 6 may be used.

Commencing at block 600, each VR headset receives the respective clap signal from the glove associated with that headset. The clap signal is associated with a timestamp (the time "t" in FIG. 4) and location stamp (from the position receiver of the respective glove) at block 602. Each headset then sends to the opposite headset its signal, timestamp, and location at block 604, and each headset receives, at block 606, the signal, timestamp, and location from the other headset.

Decision diamond 608 illustrates a first test that may be used in which each headset determines whether the difference in time between the times "t" of the signals 400, 402 is less than a threshold time period. If it is not, indicating that the signals were not generated near-simultaneously as they would be from a mutual hand clap, the logic may loop back to block 600 to await further signals.

On the other hand, if the difference in time between the times "t" of the signals 400, 402 is less than the threshold time period, the logic may flow from decision diamond 608 to decision diamond 610 to determine whether the characteristics of the signals 400, 402 match within a threshold, as they may be expected to do if generated by a mutual hand clap. For example, the shapes of the signals, the amplitudes of the signals, the periods of the signals, etc. may be used alone or in combination and compared to that of the other signal to determine whether the signal characteristics match within a threshold.

If the characteristics do not match the logic may loop back to block 600, but if they match the logic may proceed to decision diamond 612 to determine whether the locations of the gloves 300, 302 are within a threshold distance of each other, as they would be expected to be in the event of a mutual clap. If not, the logic may return to block 600, but if the locations are sufficiently close to each, one or a combination of the locations may be used at block 614 as the position reference for presenting images of the other user on the headset.

Note that repeated play of "patty cake" advantageously allows for refined position reference error reduction, because the longer the users play, the more error is reduced. The VR systems can give feedback as to when it is sufficient to stop play, or can simply delay loading content and once error has been reduced below a threshold, indicate that a computer game or other content is loaded and ready to play.

The position reference may define, for example, the origin of a virtual object rendering coordinate system relative to which display locations of virtual objects, including images of the opposite user, are presented.

Moreover, if desired the logic may move to decision diamond 616 to determine whether the positional error is sufficiently small to end the calibration process. If it is, the logic may end at state 618. Otherwise, additional claps are indicated, e.g., by presenting a prompt on the headsets, for further mutual hand claps at block 620. In one example, the determination at decision diamond 616 may be executed by comparing the difference in locations from the gloves to a second threshold smaller than the first threshold used at decision diamond 612.

Figure 7:
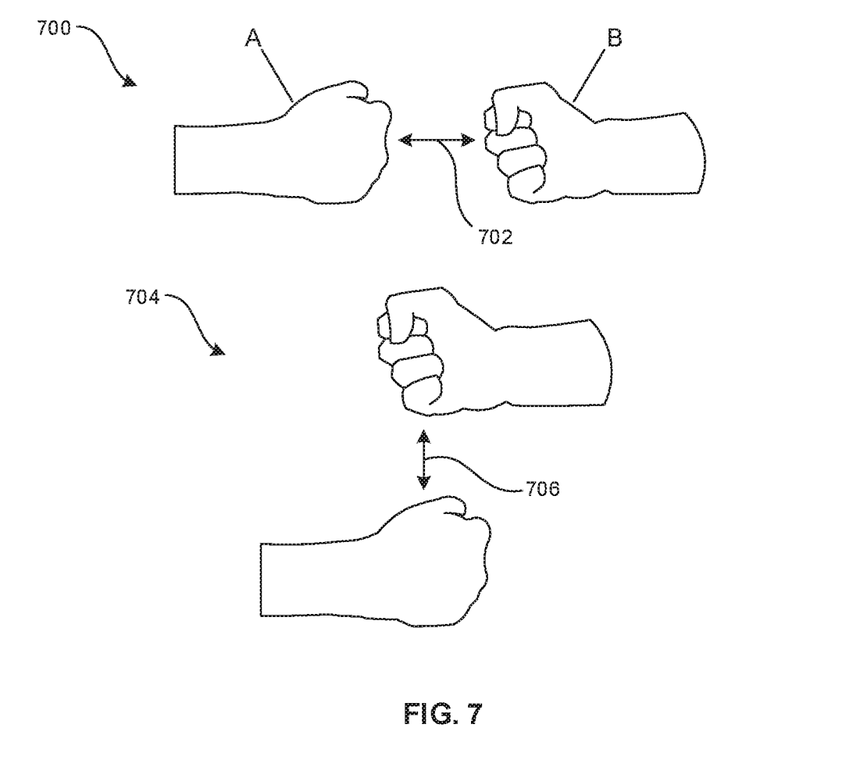
FIG. 7 is a schematic diagram of users fist-bumping.

FIG. 7 illustrates an example of the above-described hand clapping in which the users exchange fist bumps. As indicated at 700, users A and B (with motion-detecting gloves) exchange head to head bumps as indicated by the arrow 702, then, as indicated at 704, the users exchange top/bottom bumps as indicated by the arrow 706. By exchanging such multi-dimensional fist bumps, the position reference can be more precisely known in multiple axes.

Figure 8:
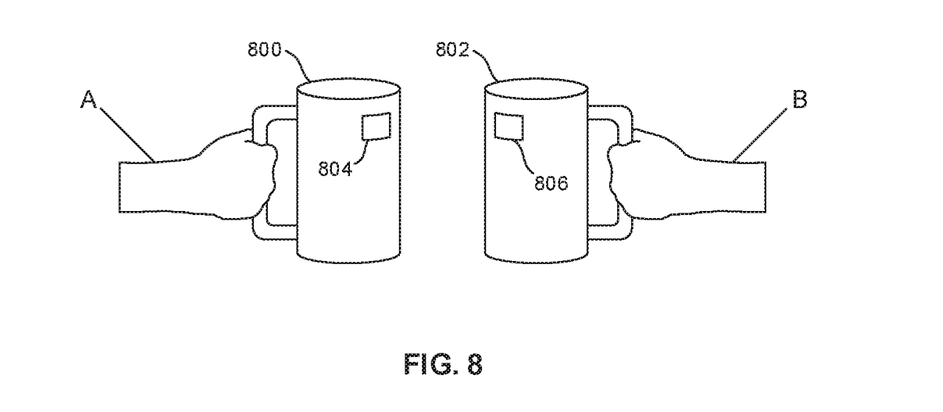
FIG. 8 is a schematic diagram of implements being wielded by the users to establish the common position reference.

In addition to using gloves with motion sensors on the users' hands, relatively rigid implements held by each user and containing motion sensors may be used to establish the position reference. For example, as shown in FIG. 8 each user A and B can hold a respective rigid implement 800, 802 with respective motions sensors 804, 806 to detect when the users contact their respective implements together. The implements may be, for instance, container glasses, sports implements such as a baseball bat on the one hand and a ball on the other, etc.

As understood by the embodiment of FIG. 8, while the real word dimensions of a person's hand may not be known with precision, dimensions of rigid real-world objects such as coffee cups typically are known, to better determine the position reference and concomitant offsets. For a baseball and bat where the ball contains a sensor and the bat sensor is in the bat handle, contact forces and angles of rotation/torque can be derived from the sensor signals, so that the position reference can be accurately determined.

The above principles may be used for representation of VR balls. For example, based on how hard a user kicks a real-world ball, information may be derived for deforming a VR image of the real-world ball. The size of the impact can be detected, and the size of deformation estimated, hence deriving the contact point.

It will be appreciated that whilst present principals have been described with reference to some example embodiments, these are not intended to be limiting, and that various alternative arrangements may be used to implement the subject matter claimed herein.

What is claimed is:

1. A system, comprising:
at least one computer memory that is not a transitory signal and that comprises instructions executable by at least one processor to:
receive from respective sensors associated with respective first and second systems respective first and second contact signals representing real world contact of two real world objects; and
using the first and second contact signals, establish at least one positional reference for at least a first virtual reality (VR) apparatus associated with the first system, the positional reference defining an origin of a virtual object rendering coordinate system relative to which display locations of virtual objects are presented, wherein the sensors are supported on first and second sensor devices and the first and second contact signals are generated by the first and second sensor devices physically contacting each other.

2. The system of claim 1, wherein the instructions are executable to:
determine whether at least a first characteristic of the first contact signal matches at least one corresponding first characteristic of the second contact signal;
responsive to identifying that the first characteristic of the first contact signal matches the first characteristic of the second contact signal, establish the positional reference; and
responsive to identifying that the first characteristic of the first contact signal does not match the first characteristic of the second contact signal, not establish the positional reference.

3. The system of claim 1, wherein the instructions are executable to:
determine whether a timestamp of the first contact signal matches a timestamp of the second contact signal;
responsive to identifying that the timestamp of the first contact signal matches the timestamp of the second contact signal, establish the positional reference; and
responsive to identifying that the timestamp of the first contact signal does not match the timestamp of the second contact signal, not establish the positional reference.

4. The system of claim 1, wherein the instructions are executable to:
determine whether a location associated with the first contact signal matches a location associated with the second contact signal;
responsive to identifying that the location associated with the first contact signal matches the location associated with the second contact signal, establish the positional reference; and responsive to identifying that the location associated with the first contact signal does not match the location associated with the second contact signal, not establish the positional reference.

5. The system of claim 4, wherein determining whether the location associated with the first contact signal matches the location associated with the second contact signal uses a first difference threshold, and responsive to identifying that the location associated with the first contact signal matches the location associated with the second contact signal according to the first difference threshold, the instructions are executable to:
   determine whether the location associated with the first contact signal matches the location associated with the second contact signal according to a second difference threshold smaller than the first distance threshold;
   responsive to identifying that the location associated with the first contact signal matches the location associated with the second contact signal according to the second distance threshold, not generate a prompt for a further clap; and
   responsive to identifying that the location associated with the first contact signal does not match the location associated with the second contact signal according to the second distance threshold, generate a prompt for a further clap.

6. The system of claim 2, wherein the first characteristics comprise spike waveform shapes.

7. The system of claim 1, wherein the respective sensors are supported by respective gloves associated with the respective systems.

8. The system of claim 1, wherein the respective sensors are supported by respective rigid implements associated with the respective systems.

9. The system of claim 1, wherein the respective sensors comprise motion sensors.

10. The system of claim 1, wherein the respective sensors comprise pressure sensors.

11. The system of claim 1, wherein the respective sensors comprise sound sensors.

12. The system of claim 1, wherein the respective sensors comprise image sensors.

13. A method, comprising:
   receiving first and second contact signals from respective first and second user-borne devices, wherein the first and second contact signals are generated by the first and second user-borne devices physically contacting each other; and
   using the first and second contact signals to establish a position reference in at least one virtual reality (VR) apparatus, such that coordinates in a first VR apparatus associated with the user of at least a first object are related to coordinates of the first object in a second VR apparatus by an offset defined by the position reference.

14. The method of claim 13, wherein the user-borne devices comprise gloves.

15. The method of claim 13, wherein the user-borne devices comprise implements wielded by the respective users.

16. The method of claim 13, wherein the contact signals are received from respective motion sensors.

17. The method of claim 13, wherein the contact signals are received from respective motion sensors.

18. The method of claim 13, wherein the contact signals are received from respective pressure sensors.

19. The method of claim 13, wherein the contact signals are received from respective sound sensors.

20. An apparatus, comprising:
   at least one processor operable to:
   receive respective first and second contact signals from respective first and second sensors on respective first and second sensor devices borne by respective users, wherein the first and second contact signals are generated by the first and second sensor devices physically contacting each other;
   using the first and second contact signals, determine a position reference; and
   use the position reference in each of respective virtual reality systems associated with the respective users to present, in each VR system, an image of the other user.

* * * * *